(12) United States Patent
Luo et al.

(10) Patent No.: US 10,495,093 B2
(45) Date of Patent: Dec. 3, 2019

(54) MICRO HYDRAULIC SUSPENSION MECHANICAL PUMP

(71) Applicant: HUAZHONG UNIVERSITY OF SCIENCE AND TECHNOLOGY, Wuhan (CN)

(72) Inventors: Xiaobing Luo, Wuhan (CN); Falong Liu, Wuhan (CN); Bin Duan, Wuhan (CN); Han Wu, Wuhan (CN); Jinyan Hu, Wuhan (CN); Xingjian Yu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 40 days.

(21) Appl. No.: 15/575,288

(22) PCT Filed: Jan. 19, 2017

(86) PCT No.: PCT/CN2017/071675
§ 371 (c)(1),
(2) Date: Nov. 17, 2017

(87) PCT Pub. No.: WO2018/107560
PCT Pub. Date: Jun. 21, 2018

(65) Prior Publication Data
US 2019/0226485 A1   Jul. 25, 2019

(30) Foreign Application Priority Data
Dec. 12, 2016 (CN) .......................... 2016 1 1139270

(51) Int. Cl.
*F04D 13/06* (2006.01)
*F04D 29/12* (2006.01)
(Continued)

(52) U.S. Cl.
CPC ..... *F04D 13/0633* (2013.01); *F04D 29/0473* (2013.01); *F04D 29/126* (2013.01); *H02K 5/10* (2013.01); *H02K 7/08* (2013.01)

(58) Field of Classification Search
CPC .. F04D 13/06; F04D 13/0606; F04D 13/0613; F04D 13/0626; F04D 13/0633;
(Continued)

(56) References Cited

U.S. PATENT DOCUMENTS 3,951,573 A * 4/1976 Dunning ................. F16C 17/04
                                                             417/423.13
2008/0262289 A1   10/2008 Goldowsky
(Continued)

FOREIGN PATENT DOCUMENTS

CN         1372479 A      10/2002
CN       201415579 Y       3/2010
(Continued)

OTHER PUBLICATIONS

International Search Report dated Sep. 19, 2017 of corresponding International application No. PCT/CN2017/071675; 5 pgs.

*Primary Examiner* — Kenneth J Hansen
(74) *Attorney, Agent, or Firm* — Maier & Maier, PLLC

(57) ABSTRACT

A micro-hydraulic suspension mechanical pump includes a volute, an upper cover, an impeller, a brushless motor, a waterproof sleeve and water lubrication spiral groove thrust bearings, each having stationary and rotating rings. A water inlet and a water outlet channel are provided on the volute, and a middle water inlet hole is formed on the upper cover. The water lubrication spiral groove thrust bearings are provided above and below a magnetic steel rotor. During operation of the micro-hydraulic suspension mechanical pump, a liquid film is formed between the stationary ring and the rotating ring to enable the magnetic steel rotor to be suspended, and a liquid film is formed between the outer
(Continued)

wall of the rotor sleeve and the inner wall of the waterproof sleeve. Due to suspension of the rotor, wear caused contact is avoided, and service life of the micromechanical pump is improved.

4 Claims, 5 Drawing Sheets

(51) Int. Cl.
    *H02K 7/08*         (2006.01)
    *H02K 5/10*         (2006.01)
    *F04D 29/047*     (2006.01)

(58) Field of Classification Search
    CPC .............. F04D 29/2266; F04D 29/047; F04D 29/0473; F04D 29/0413
    See application file for complete search history.

(56) References Cited

U.S. PATENT DOCUMENTS

| | | | |
|---|---|---|---|
| 2011/0027112 A1* | 2/2011 | Negishi | F01P 5/12 417/423.7 |
| 2013/0064695 A1* | 3/2013 | Kim | F04D 13/06 417/357 |

FOREIGN PATENT DOCUMENTS

| | | |
|---|---|---|
| CN | 102788022 A | 11/2012 |
| KR | 20080024539 A | 3/2008 |
| WO | 2015114136 A1 | 8/2015 |

* cited by examiner

MICRO HYDRAULIC SUSPENSION MECHANICAL PUMP

FIELD OF THE INVENTION

The invention relates to a technical field of mechanical pump, and more particularly to a micro hydraulic suspension mechanical pump.

BACKGROUND OF THE INVENTION

With the rapid development of electronic technology, electronic equipment marches rapidly towards aspects of functional diversification, information, integration and so on. The constantly increasing heat flux of electronic devices makes the large-scale application of the active thermal control system to be inevitable. A micro pump is exactly a key driving device of the active thermal control system. As an important research direction of the micro electro mechanical system, the micro mechanical pump is widely used in fields of drug transport system, electronic device cooling system, thermal control system, micro-chemical analysis system and the like.

Currently, the key technology of the micro-mechanical pump lies on: 1) cross-scale design which is achieved by combining and improving traditional pump design theories in a case of large scale difference between devices; 2) flow and thermal coupling, which require consideration of the feedback effect of both the heat production by the device and the heat dissipated in the system on the heat management system; 3) numerical simulation in which cross-scale flow and thermal problems in the flow field are accurately simulated; and 4) design for structure reliability, including leak proof design, anti-seismic design, shafting design and the like.

Currently, reliability has become a restriction factor in the micro pump. In the micro pump, the shafting, like a backbone, is especially responsible for reliability of the complete machine. As the only moving part of the micro pump, the shafting is designed to be stable and robust, which is the only means of prolonging service life of the complete machine. The bearings used in the micromechanical pumps are now divided into a mechanical contact bearing and a non-contact bearing. Due to the existence of bearing wear of the mechanical contact bearings, the service life of the micro-pump is seriously restricted. The non-contact bearing performs non-contact operation in the micro pump, which can greatly improve reliability and service life of the micro pump.

At present, the shafting suspension technology applied in the non-contact bearing mainly adopts the following means: active control suspension, permanent magnetic suspension, and hydraulic suspension. The basic principle of the active control suspension is that a position sensor captures dynamic position of a rotor and limits the rotor to the axle center through a dynamic magnetic field generated by a main control electromagnet. The active control suspension has advantages of high control precision and large load range, but also features a complex control circuit, a high price and increased additional power consumption. In the permanent magnetic suspension, the degree of freedom of the rotor is limited by repulsion of the permanent magnet. The permanent magnetic suspension has advantages of a simply and reliable structure and low assembly requirements, but cannot achieve suspension of full degrees of freedom without introducing external forces. In the hydraulic suspension, a high-pressure liquid film is generated on a suspension surface by high-speed rotation of a rotor to support suspension of the rotor. The structure is stable and reliable and has a small size, but is strict in machining and installation precision, and thus is difficult to machine and install.

SUMMARY OF THE INVENTION

In view of the above-described problems and improvement requirements, it is one objective of the invention to provide a micro hydraulic suspension mechanical pump which is capable of realizing non-contact operation of a magnetic steel rotor, thereby greatly reducing wear of the magnetic steel rotor and improving service life of the micro hydraulic suspension mechanical pump.

To achieve the above objective, in accordance with the invention, there is provided a micro hydraulic suspension mechanical pump, comprising: a volute, an upper cover, an impeller, a brushless motor, a waterproof sleeve and a water lubrication spiral groove thrust bearing, wherein, a water inlet channel and a water outlet channel are provided on the volute, the inner space of the volute serves as a pump cavity, and the water inlet channel and the water outlet channel are respectively communicated with the pump cavity;

the brushless motor includes a motor shell, a coil, a magnetic steel rotor, a waterproof sleeve, a rotor sleeve and a rotor rotating shaft, in which the motor shell is fixedly connected to the volute and receives the upper cover, the coil is installed on the side wall of the motor shell, the inner wall of the motor shell is sleeved with the waterproof sleeve for protecting the coil, a middle water inlet hole communicated with the pump cavity is formed on the upper cover to allow water to flow into the waterproof sleeve, the magnetic steel rotor is located within the motor shell and is fixedly arranged on the rotor rotating shaft in a sleeved manner, the rotor sleeve is connected to the outer side of the magnetic steel rotor in a sleeved manner, the upper end of the rotor rotating shaft is fixedly connected to the impeller within the pump cavity after penetrating through the upper cover, a first gap is formed between the inner side wall of the magnetic steel rotor and the outer side surface of the rotor rotating shaft to serve as a first water flow channel which is communicated with the pump cavity, and a second gap is formed between the outer side wall of the rotor sleeve and the inner side wall of the motor shell to serve as a second water flow channel which is communicated with the middle water inlet hole;

above and below the magnetic steel rotor are respectively provided one water lubrication spiral groove thrust bearing including a stationary ring and a rotating ring with spiral grooves, in which the rotating ring of the water lubrication spiral groove thrust bearing above the magnetic steel rotor is provided on the top surface of the magnetic steel rotor and the stationary ring thereof is provided at the bottom of the upper cover, and the rotating ring of the water lubrication spiral groove thrust bearing below the magnetic steel rotor is provided on the bottom surface of the magnetic steel rotor and the stationary ring thereof is provided on the inner bottom surface of the waterproof sleeve.

Preferably, a plurality of the middle water inlet holes are provided in a circumferential direction.

Preferably, the stationary ring and the rotating ring are both made of hard alloy.

Preferably, a positioning boss is provided on the motor shell and a positioning groove matched with the positioning boss is provided on the volute to allow the impeller to be positioned at a proper position in the pump cavity.

In general, compared with the prior art, the invention has the following advantage effects:

when the micro hydraulic suspension mechanical pump works, a liquid film can be formed between the stationary ring and the rotating ring to enable the magnetic steel rotor to be suspended, and a liquid film can also be formed between the outer wall of the rotor sleeve and the inner wall of the waterproof sleeve, so that non-contact suspension of the magnetic steel rotor can be realized. In addition, owing to the waterproof sleeve, the coil is completely isolated from the magnetic steel rotor in the brushless motor, so that water resistance of the coil in the brushless motor can be ensured. Due to non-contact suspension of the magnetic steel rotor, the wear of the magnetic steel rotor can be greatly reduced, which improves service life of the micro hydraulic suspension mechanical pump.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
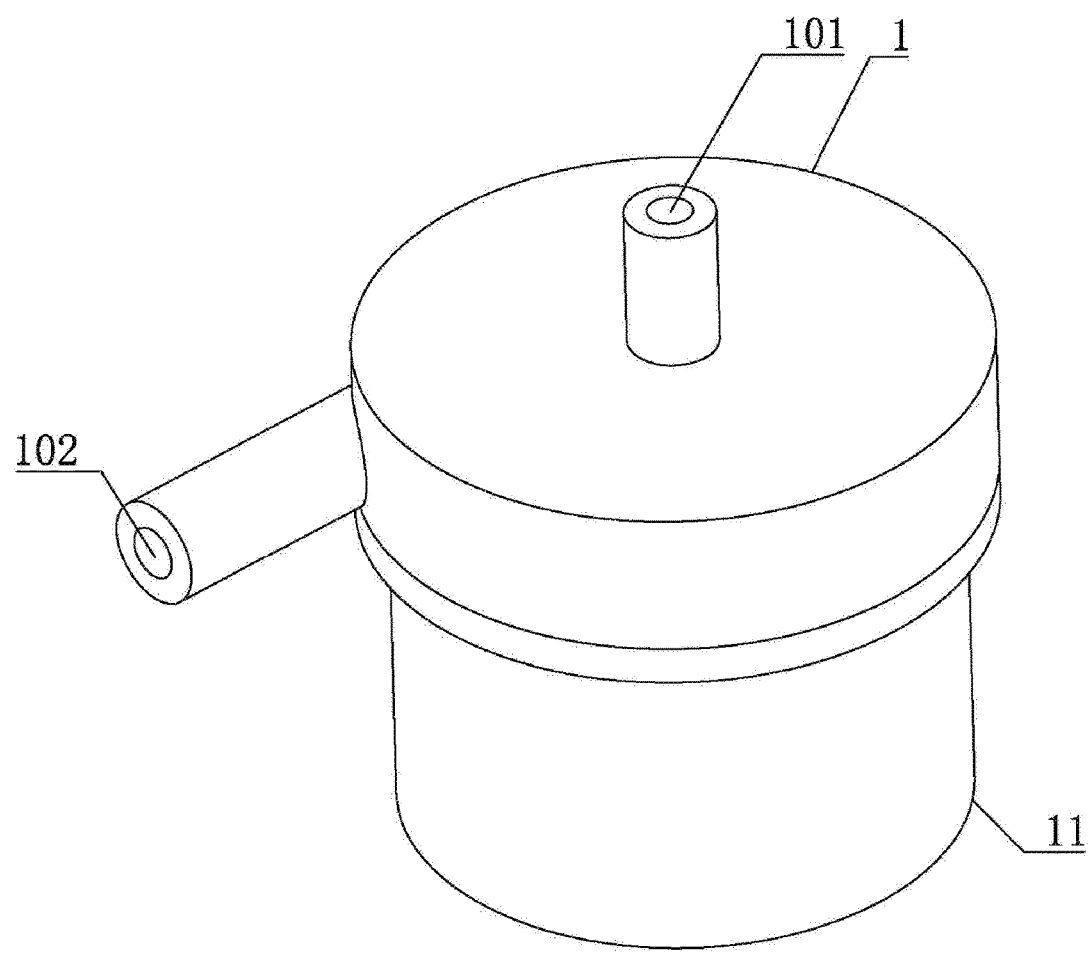
FIG. 1 is a schematic structural diagram of a micro hydraulic suspension mechanical pump according to the invention.
Figure 2:
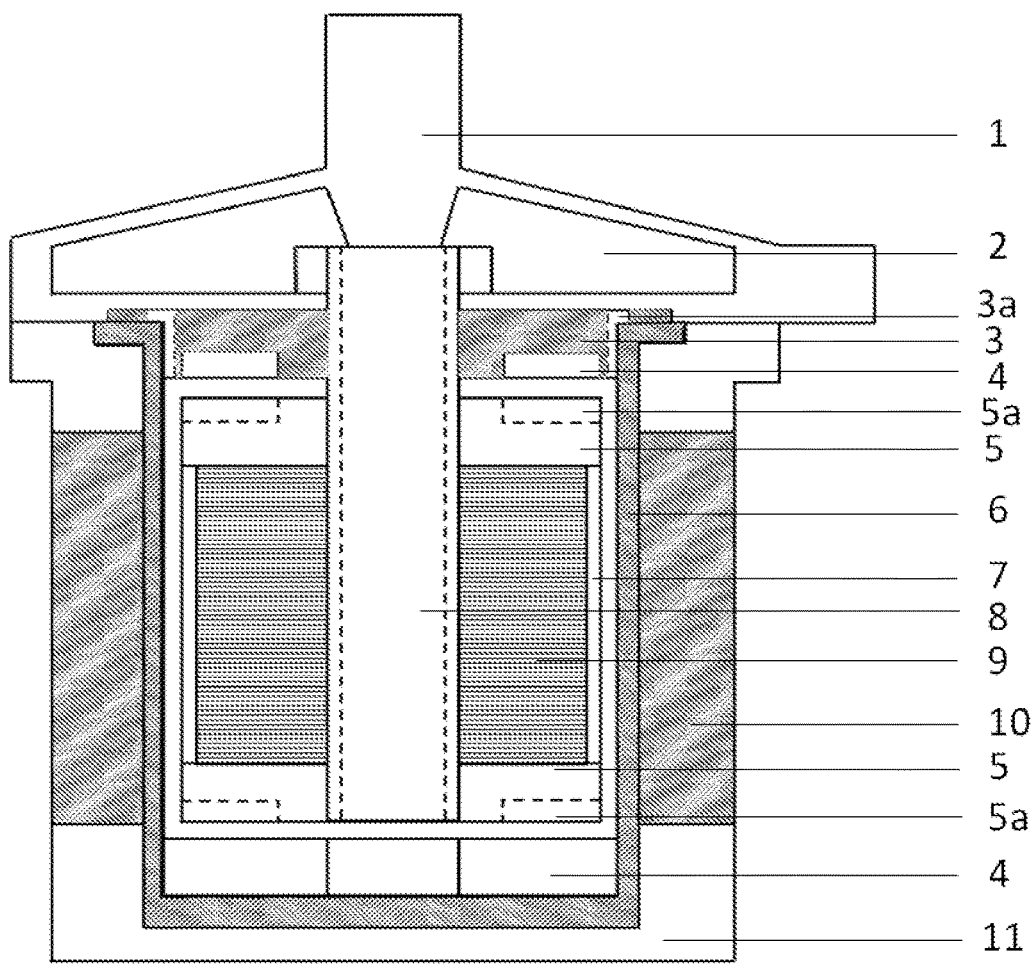
FIG. 2 is a schematic cross-sectional view of the micro hydraulic suspension mechanical pump according to the invention.
Figure 3:
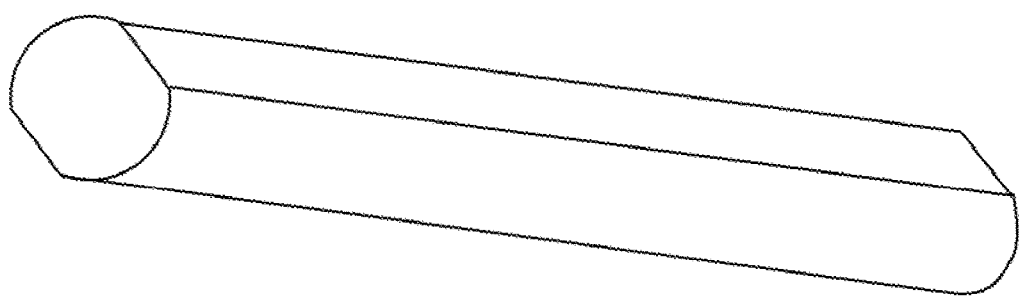
FIG. 3 is a schematic structural diagram of a rotor rotating shaft in the invention.
Figure 4:
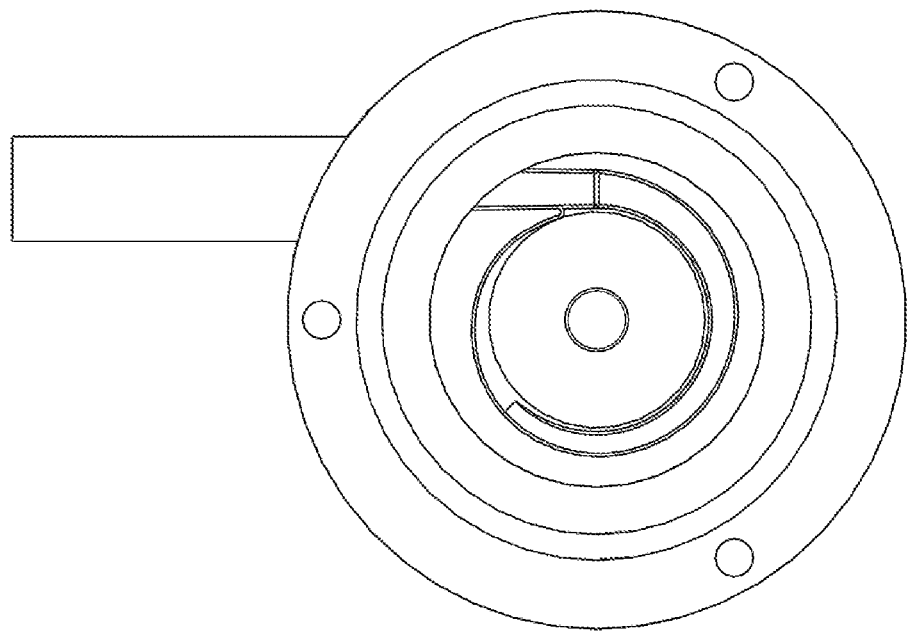
FIG. 4 is a schematic structural diagram of a volute in the invention.
Figure 5:
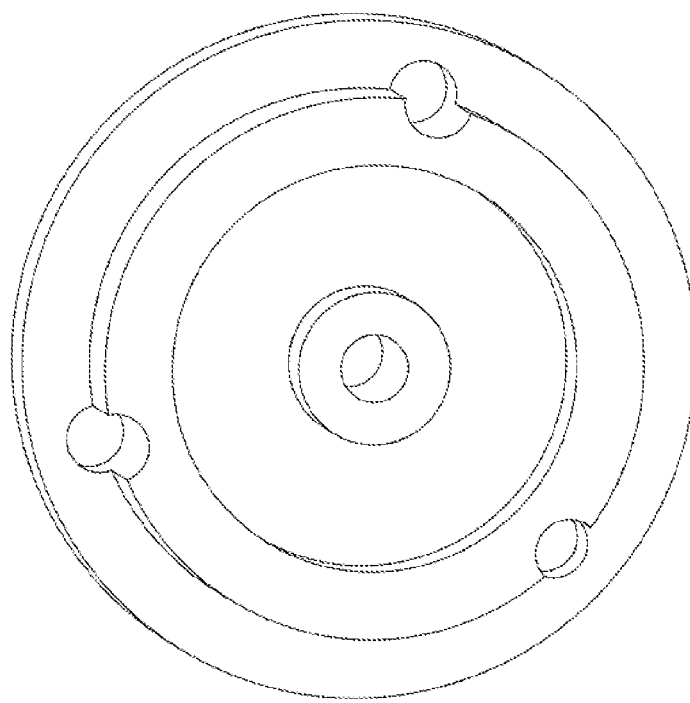
FIG. 5 is a schematic structural diagram of an upper cover in the invention.
Figure 6:
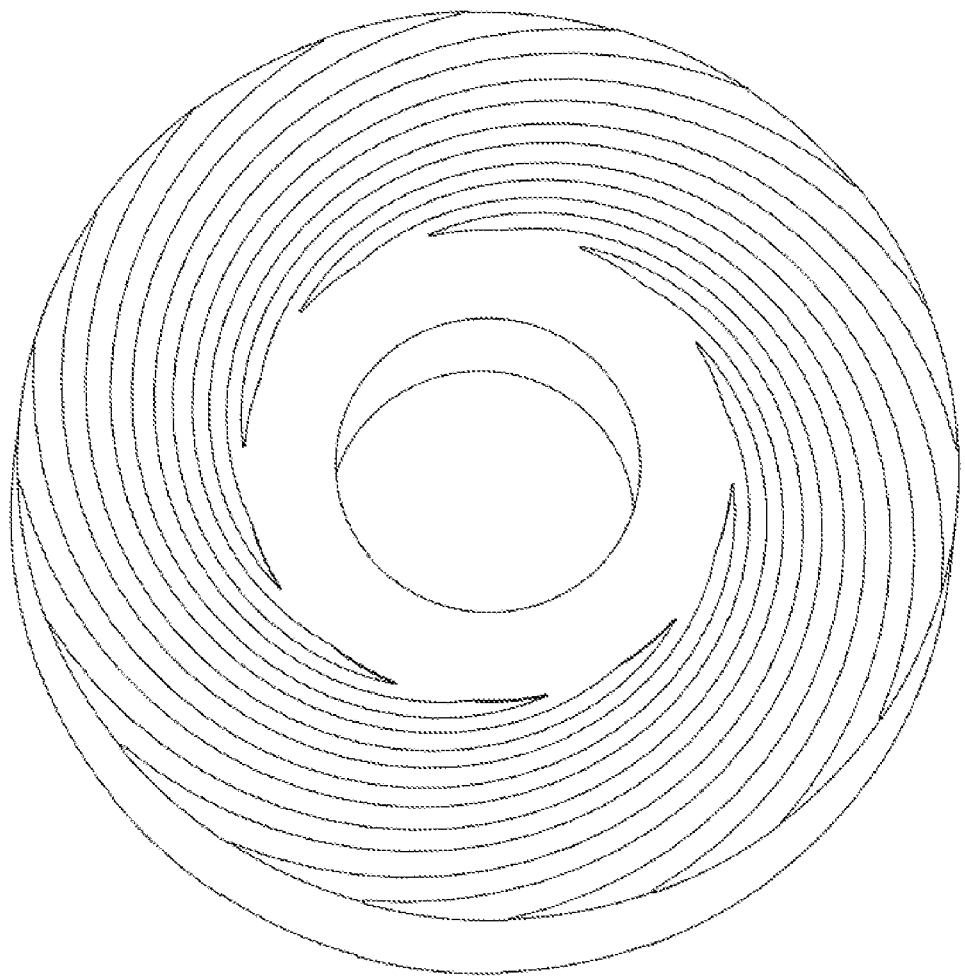
FIG. 6 is a schematic structural diagram of a rotating ring in the invention.
Figure 7:
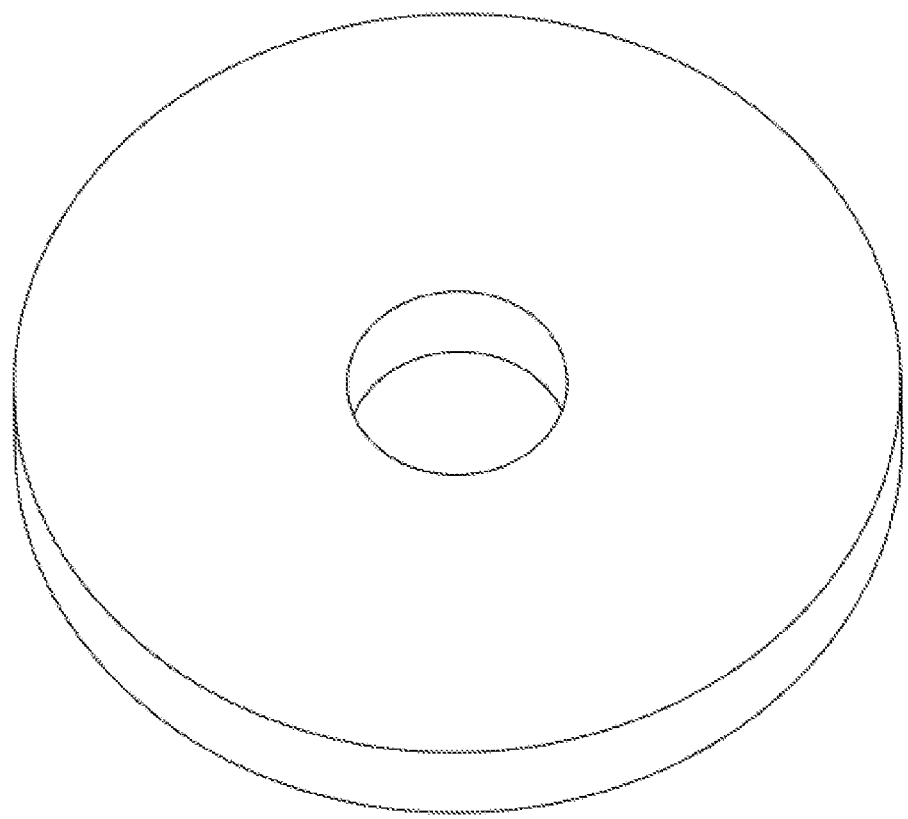
FIG. 7 is a schematic structural diagram of a stationary ring in the invention.

With reference to FIGS. 1-7, a micro hydraulic suspension mechanical pump is illustrated, comprising: a volute 1, an upper cover 3, an impeller 2, a brushless motor, a waterproof sleeve 6 and a water lubrication spiral groove thrust bearing.

A water inlet channel and a water outlet channel are provided on the volute 1, and the inner space of the volute 1 serves as a pump cavity, the water inlet channel and the water outlet channel being respectively communicated with the pump cavity.

The brushless motor includes a motor shell 11, a coil 10, a magnetic steel rotor 9, a waterproof sleeve 6, a rotor sleeve 7 and a rotor rotating shaft 8, in which the motor shell 11 is fixedly connected to the volute 1 and receives the upper cover 3. Preferably, the volute 1 is provided with connection through holes, and bolts are screwed to the upper portion of the motor shell 11 after penetrating through the connection through holes. The coil 10 is installed on the side wall of the motor shell 11, and the inner wall of the motor shell 11 is sleeved with the waterproof sleeve 6 for protecting the coil 10. A middle water inlet hole 3a communicated with the pump cavity is formed on the upper cover 3 to allow water to flow into the waterproof sleeve 6. Preferably, the upper cover 3 is placed on the waterproof sleeve 6, the magnetic steel rotor 9 is located within the motor shell 11 and is fixedly arranged on the rotor rotating shaft 8 in a sleeved manner, and the rotor sleeve 7 is connected to the outer side of the magnetic steel rotor 9 in a sleeved manner. The upper end of the rotor rotating shaft 8 is fixedly connected to the impeller 2 within the pump cavity after penetrating through the upper cover 3. A first gap is formed between the inner side wall of the magnetic steel rotor 9 and the outer side surface of the rotor rotating shaft 8 to serve as a first water flow channel which is communicated with the pump cavity, and a second gap is formed between the outer side wall of the rotor sleeve 7 and the inner side wall of the motor shell 11 to serve as a second water flow channel which is communicated with the middle water inlet hole 3a.

Above and below the magnetic steel rotor 9 are respectively provided one water lubrication spiral groove thrust bearing including a stationary ring 4 and a rotating ring 5 with spiral grooves, in which the rotating ring 5 of the water lubrication spiral groove thrust bearing above the magnetic steel rotor 9 is provided on the top surface of the magnetic steel rotor 9 and the stationary ring 4 thereof is provided at the bottom of the upper cover 3; and the rotating ring 5 of the water lubrication spiral groove thrust bearing below the magnetic steel rotor 9 is provided on the bottom end surface of the magnetic steel rotor 9 and the stationary ring 4 thereof is provided on the inner bottom surface of the waterproof sleeve 6.

Further, a plurality of the middle water inlet holes 3a are provided in a circumferential direction. The stationary ring 4 and the rotating ring 5 are both made of hard alloy. A positioning boss is provided on the upper cover 3 and a positioning groove matched with the positioning boss is provided on the volute 1 to allow the impeller 2 to be positioned at a proper position in the pump cavity.

The inner space surrounded by the motor shell 11 and the upper cover 3 arranged on the motor shell 11 can accommodate the magnetic steel rotor 9. A fluid inlet channel 101 and a fluid outlet channel 102 are provided on the volute 1 and are communicated with the pump cavity within the volute 1, so that fluid can be driven by the impeller 2 from the fluid inlet channel 101 towards the fluid outlet channel 102 and is pumped out through an outlet pipeline. Most of the fluid entering the mechanical pump mainly flows out in this way, and a small part of the fluid may enter the motor shell 11 and take away the heat.

The rotor rotating shaft 8 provides power for driving the impeller 2, and the rotating ring 5 is made of hard alloy to meet requirement for long-time operation. In order to fully utilize characteristics of the brushless motor, the brushless motor must be ensured to have a perfect waterproof performance. To this end, a waterproof sleeve 6 is arranged between the stator coil 10 and the rotor sleeve 7 to isolate the coil 10 from the magnetic steel rotor 9, thus providing waterproof effect for the stator coil 10. Due to small size of the micro pump, the traditional installation mode of the impeller cannot be used. In the invention, in order to achieve reliable installation of the impeller 2, the impeller 2 is in interference fit with the output rotor rotating shaft 8 of the magnetic steel rotor 9 and is fixed through a binder. Also, the rotor rotating shaft 8 can be machined from one cylindrical shaft, the outer side of which is partly cut off, so that a gap is formed between the rotor rotating shaft 8 and the magnetic steel rotor 9. Meanwhile, the motor shell 11 is a component of the pump body, and the motor shell 11 and volute 1 form a pump cavity of the micro pump together. A positioning boss is provided on the contact end face of the motor shell 11 in contact with the volute 1, and a positioning groove is correspondingly provided on a contact end face of the volute 1 in contact with the motor protection shell 11. The positioning boss and the positioning groove cooperate to ensure that the impeller 2 and the pump cavity body are concentric when the impeller 2 is installed and positioned, so that mechanical interference and adverse effect on the performance caused by eccentric installation of the impeller 2 are prevented. Threaded holes are formed on the motor shell 11, through holes are formed in corresponding positions of the volute 1, and the motor shell 11 and the motor shell 11 are connected by bolts.

A spiral groove 5a is engraved in the rotating ring 5 to allow a liquid film to be formed between the rotating ring 5 and the stationary ring 4, and a liquid film can be formed between the outer side wall of the rotor sleeve 7 and the inner side wall of the waterproof sleeve 6, so that a supporting force required for suspension of the magnetic steel rotor 9 is provided. Preferably, the rotating ring 5 and the stationary ring 4 are both made of hard alloy, so as to prolong the service life. In order to provide enough flow for the liquid films and take away heat, three middle water inlet holes 3a are formed on the upper cover 3, so that a part of water enters the gap between the rotating ring 5 and the stationary ring 4 above the magnetic steel rotor 9, and the other part of water enters the gap between the rotor sleeve 7 and the waterproof sleeve 6 from a volute 1 and then flows back to the volute 1 through the water flow channel formed by the rotor rotating shaft 8 and the magnetic steel rotor 9.

In the invention, water flow channels are formed through the structure design of the middle water inlet holes 3a provided on the upper cover 3 and the rotor rotating shaft 8, which provides enough flow for the radial liquid film bearing and takes away heat generated by the motor. In addition, through design of the waterproof sleeve 6, the stator component is completely isolated from the rotor component in the brushless motor, so that water resistance of the stator component of the brushless motor can be ensured. Due to non-contact suspension of the rotor, wear of the rotor can be greatly reduced, which improves service life of the micromechanical pump.

The waterproof sleeve 6 may be arranged between the stator coil 10 and the rotor sleeve 7 to isolate the stator coil 10 from water within the motor shell 11, so that the water resistance of the stator coil 10 of the motor can be ensured.

While particular embodiments of the invention have been shown and described, it will be obvious to those skilled in the art that changes and modifications may be made without departing from the spirit and scope of the invention.

The invention claimed is:

1. A micro hydraulic suspension mechanical pump comprising: a volute, an upper cover, an impeller, a brushless motor, a waterproof sleeve and at least one water lubrication spiral groove thrust bearing, wherein a water inlet channel and a water outlet channel are provided on the volute, inner space of the volute serves as a pump cavity, and the water inlet channel and the water outlet channel are respectively communicated with the pump cavity;

the brushless motor includes a motor shell, a coil, a magnetic steel rotor, a waterproof sleeve, a rotor sleeve and a rotor rotating shaft, in which the motor shell is fixed connected to the volute and receives the upper cover, the coil is installed on a side wall of the motor shell, an inner wall of the motor shell is sleeved with the waterproof sleeve for protecting the coil, a middle water inlet hole communicated with the pump cavity is formed on the upper cover to allow water to flow into the waterproof sleeve, the magnetic steel rotor is located within the motor shell and is fixedly arranged on the rotor rotating shaft in a sleeved manner, the rotor sleeve is connected to an outer side of the magnetic steel rotor in a sleeved manner, an upper end of the rotor rotating shaft is fixedly connected to the impeller within the pump cavity after penetrating through the upper cover, a first gap is formed between an inner side wall of the magnetic steel rotor and an outer side surface of the rotor rotating shaft to serve as a first water flow channel which is communicated with the pump cavity, and a second gap is formed between an outer side wall of the rotor sleeve and an inner side wall of the motor shell to serve as a second water flow channel which is communicated with the middle water inlet hole; and the at least one water lubrication spiral groove thrust bearing comprises one thrust bearing located above the magnetic steel rotor and an other thrust bearing located below the magnetic steel rotor, each respective thrust bearing including a stationary ring and a rotating ring with spiral grooves, in which the rotating ring of the thrust bearing above the magnetic steel rotor is provided on a top surface of the magnetic steel rotor and the stationary ring thereof is provided at a bottom of the upper cover, and the rotating ring of the other thrust bearing below the magnetic steel rotor is provided on a bottom end surface of the magnetic steel rotor and the stationary ring thereof is provided on an inner bottom surface of the waterproof sleeve.

2. The micro hydraulic suspension mechanical pump of claim 1, wherein a plurality of the middle water inlet holes are provided in a circumferential direction.

3. The micro hydraulic suspension mechanical pump of claim 1, wherein the stationary ring and the rotating ring are both made of hard alloy.

4. The micro hydraulic suspension mechanical pump of claim 1, wherein a positioning boss is provided on the motor shell and a positioning groove matched with the positioning boss is provided on the volute to allow the impeller to be positioned at a proper position in the pump cavity.

\* \* \* \* \*